Jan. 24, 1961    J. T. JONES    2,968,883
DISPLAY APPARATUS
Filed Feb. 18, 1957    2 Sheets-Sheet 1
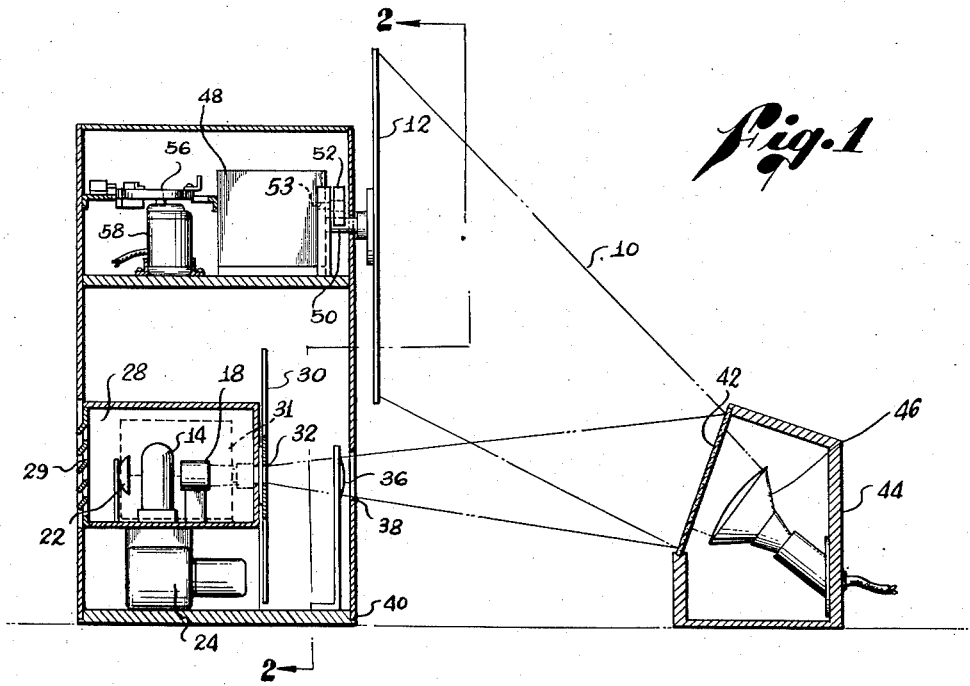
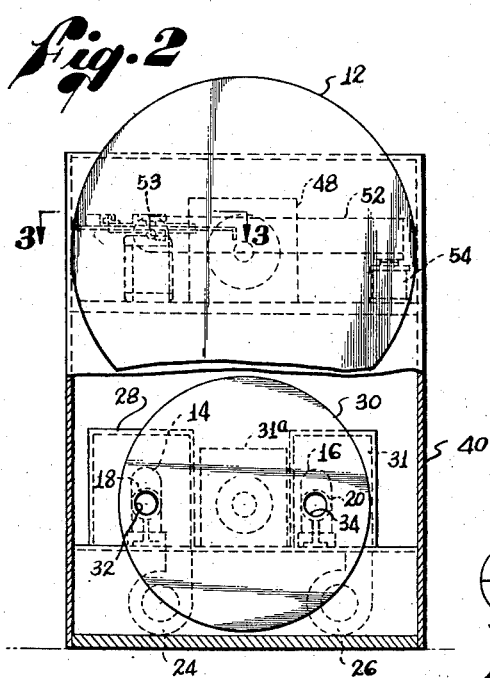
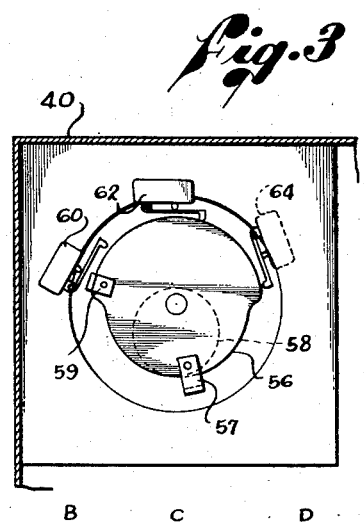
INVENTOR.
JOHN THOMPSON JONES
BY
Attorneys Jan. 24, 1961 J. T. JONES 2,968,883
DISPLAY APPARATUS
Filed Feb. 18, 1957 2 Sheets-Sheet 2

INVENTOR.
JOHN THOMPSON JONES
BY
Attorneys

United States Patent Office 2,968,883
Patented Jan. 24, 1961

2,968,883

DISPLAY APPARATUS

John T. Jones, 5304 Brittain St., Long Beach, Calif.

Filed Feb. 18, 1957, Ser. No. 640,643

7 Claims. (Cl. 40—130)

This invention relates to visual display apparatus and more particularly to a display apparatus for producing interesting and attention-commanding light effects.

In the commercial markets of today competition is generally quite keen and therefore certain advantages are possessed by the seller who is most successful in familiarizing the public with his products. Certain mediums employ visual means to communicate messages which will inform the public of various products. Examples of such mediums are television, window displays, display signs and motion pictures. In general, visual communications are very effective to familiarize the public with a product; however, in order to take full advantage of a visual means of communication, the display employed must command attention as well as provide an interesting interlude for the observer. If a display is provided which will command attention and hold interest, then the message contained in the display will be observed by the public and impressed upon their minds.

In its more general form the present invention comprises an attention-commanding and interesting visual display apparatus including: a means to produce intermittent light and means to project this intermittent light upon a revolving display. In addition, means may also be provided for varying the relationship between the rate of rotation of the display and the rate of occurrence of the intermittent light to thereby produce various interesting and entertaining effects. The system may also include an arrangement for periodically illuminating the revolving display with a continuous light.

It is therefore a major object of this invention to provide a novel and improved visual display apparatus.

Another object of this invention is to provide an apparatus which provides an attention-commanding and interesting visual display.

Still another object of this invention is to provide a visual display apparatus which may be embodied in large outdoor displays.

Still a further object of this invention is to provide a moving-display apparatus wherein little noise results from operating parts.

A further object of this invention is to provide light display apparatus capable of producing increased light intensity.

These and other objects and advantages of this invention will become apparent from the following description of a preferred form thereof and from the drawings illustrating that form in which:

Figure 1 is a sectional view of a display apparatus constructed in accordance with the principles of this invention;

Figure 2 is a vertical sectional view taken along the line 2—2 of Figure 1;

Figure 3 is a horizontal sectional view taken along the line 3—3 of Figure 2;

Figure 5 shows illustrations of displays which may be formed by the apparatus of this invention;

Figure 4:
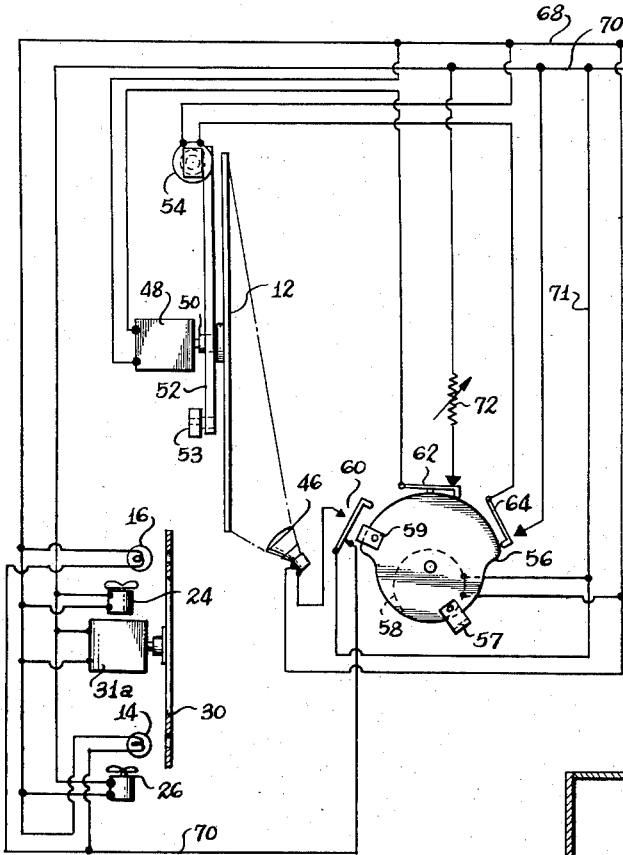
Figure 4 is a diagrammatic representation of an electrical system utilized in conjunction with the apparatus of Figure 1.

Reference will now be had to the drawings, and particularly to Figures 1, 2 and 3, which show a system for effecting the visual display of this invention. As shown, the apparatus includes a light source for forming an intermittent light beam 10 which is projected upon a moving wheel or disk 12. The disk 12 carries a display pattern and as the relationship between the rate of occurrence of the intermittent light beam 10 and the rate of rotation of the disk 12 are varied, an extremely interesting display is provided to a person observing the disk 12.

The light forming the beam 10 is generated by lamps 14 and 16. Light emanating from the lamps 14 and 16 passes through lenses 18 and 20 respectively. Light reflectors, e.g. reflector 22, are provided to intensify the light passing through the lenses 18 and 20. The temperatures of the lamps 14 and 16 are maintained at satisfactory operating levels by blowers 24 and 26, respectively. The blowers 24 and 26 force air into the enclosures 28 and 31, housing the lamps 14 and 16 thus causing air to be circulated as through the vents 29.

The two light beams which emanate from the enclosures 28 and 31 are directed such as to impinge upon a disk 30. The disk 30 contains apertures 32 and 34 which are formed at diametrically opposed positions upon the disk 30; however, the radial distances from the center of the disk 30 to the apertures 32 and 34 are different. Therefore as the disk 30 is rotated about its center, there is one position in which light from the enclosures 28 and 31 respectively may fully pass through the apertures 32 and 34. It is to be noted, however, that due to the different positions, radially, of the apertures 32 and 34, each aperture passes light from only one of the enclosures 28 and 31. In this manner, the light from both the lamps 14 and 16 contribute to the light beam 10 to thereby greatly intensify the beam 10 and to better illuminate the disk 12.

The disk 30 is directly coupled to a motor 31a which revolves the disk about its center at a high rate of speed, 2000 r.p.m. for example. During each revolution of the disk 30 an instant will occur when light may pass through the apertures 32 and 34 to form intermittent light beams. The intermittent light beams emerging from the apertures 32 and 34 in the disk 30, pass through lenses as the lens 36 shown in Figure 1, and then through apertures in the overall housing 40 as the aperture 38. These light beams then impinge upon a mirror 42 mounted upon a support 44 and are reflected to illuminate the face of the disk 12. The support 44 also mounts a lamp 46 at the side of the mirror 42. The lamp 46 is for projecting a beam of light upon the face of the disk 12 which is continual during certain periods.

A motor 48 is mounted in the upper portion of the housing 40 and is coupled to the disk 12 by a shaft 50. An electro-magnetic brake for the disk 12 is formed by a brake lever 52, one end of which is pivotally anchored at point 53. The lever 52 is urged against the shaft 50 by a solenoid 54.

Also positioned in the upper portion of the housing 40 is a programing mechanism for opening and closing various electrical switches to thereby program the rate of rotation of the disk 12, the operation of the brake lever 52, and the illumination of the disk 12 with a continuous light. The programming mechanism is best shown in Figure 3. This mechanism includes a cam 56, which is driven by a motor 58. The cam 56 includes substantially 180 degrees of raised surface, and two extensions 57 and 59 which are mounted to provide switching surfaces in planes different from the plane of the cam 56. The extension 57 serves to close a switch 64, while the extension 59 motivates a switch 60. The 180 degree raised portion of the cam 56 closes the switch 62. The extensions 57 and 59 are vertically offset from the cam 56 so as to act only upon one of the switches 60 or 64. The cam is moved by the motor 58 at a relatively low speed, one-half revolution per minute for example, and as it varies the states of the switches 60, 62 and 64 the system of Figure 1 is energized in different modes to provide fascinating visual effects. In general these visual effects are the result of varying the rate of rotation of the disk 12, relative to the repetitive rate of the intermittent light illuminating the disk 12.

Reference will now be had to Figure 4 which shows the electrical system for controlling the mode of operation of the system as shown in Figures 1, 2 and 3. It is to be noted, that several of the parts shown in Figures 1, 2 and 3 are shown symbolically in Figure 4. These parts carry a similar reference numeral in all of the figures.

There are shown in Figure 4 a pair of terminals 66 which are adapted to be connected to a source of alternating-current electrical energy which will serve to energize the electrical system. The terminals 66 are individually connected to conductors 68 and 70, therefore whenever a path for electrical current exists between the conductors 68 and 70, the electrical components located within such a path will be energized.

Certain components within the system are continually energized, including the motor 58 which continually revolves the cam 56 thereby programming the operation of the visual display apparatus. Additionally, the motor 31a, which serves to revolve the disk 30 to gate the light from the enclosures 28 and 31 to provide intermittent light, is continually energized. The blowers 24 and 26 which serve to circulate air about the bulbs 14 and 16, to maintain the temperature of these bulbs at a safe operating level, are also continually energized. Therefore, the motors 31a and 58 and the blowers 24 and 26 are connected directly between the conductors 68 and 70 to thus be continually energized.

The motor 48 which drives the disk 12 is serially connected with the switch 62, between the lines 68 and 70. Therefore the motor 48 is energized when the switch 62 is closed by the raised portion of the cam 56. A variable resistor 72 is also connected in serial fashion with the switch 62 and the motor 48 and serves to limit the current passing through this serial path to thereby control the limit of full speed for the motor 48.

The solenoid coil 54 which motivates the brake lever 52 is energized at a time when the switch 64 is closed by an extension 57 mounted upon the cam 56. The switch 64 is therefore serially connected with the coil 54 between the conductors 68 and 70. The extension 57 is of a size as to close the switch 64 for a duration sufficient to brake the disk 12 to a full stop.

The switch 60 controls the type of light which illuminates the disk 12. That is, during the time when the movable contact of the switch 60 is in a raised position, a circuit will exist from the conductor 68 through a line 69, the lamp 46 and a line 71 to the conductor 70. However, when the movable contact of the switch 60 is in the lowered position, a circuit will exist from the conductor 68 through the lamps 16 and 14 in a parallel fashion to the lower immovable contact of the switch 60. This path then continues through the movable contact of the switch 60 to the conductor 70 via the line 71.

The switch 60 is operated by the extension 59 mounted upon the cam 58. Therefore, during the interval when the cam extension 59 raises the movable contact of the switch 60, the lamp 46 will be energized to illuminate the disk 12; however, during the remainder of the cycle of operation, the movable contact of the switch 60 will be in a lower position and the lamps 14 and 16 will be energized to illuminate the disk 12 with intermittent light.

The operation of the system will now be discussed in conjunction with Figure 5 which shows simplified displays A, B, C and D which may be made to appear to an observer of the disk 12.

When the terminals 66 of the visual display apparatus are connected to a source of electrical energy, the conductors 68 and 70 will be energized thereby causing the blowers 24 and 26 and the motors 31 and 58 to be energized. However, the energization of these elements alone will create no visual display upon the disk 12. Assume now that the cam 56 is in a position to close the switch 62 and thereby energize the motor 48. The motor 48 thus starts from a standstill and accelerates to rotate the disk 12 at a continually increasing rate.

Assume further that as the disk 12 begins to accelerate, the cam 56 is so positioned that the extension 59 is remote from the switch 60. The movable contact of the switch will therefore be in the lower position to thereby energize the lamps 14 and 16. With the lamps 14 and 16 energized and the disk 30 revolving, intermittent light will emanate from the housing 40 to impinge upon the mirror 42 and be reflected to illuminate the disk 12. The pattern as shown in the display D of Figure 5 will now be assumed to be placed on the face of the disk 12, to explain some of the displays which may be provided to an observer.

As the disk 12 gradually accelerates, a display on the disk 12 will first appear which consists of many lines extending radially from the center of the disk 12. This display will be formed because the intermittent beam 10 has a higher rate than the rate of rotation of the disk 12; therefore, the disk will be illuminated with the line in various positions about the disk. As the disk 12 accelerates the number of lines in the display will reduce in number depending upon the relative rates of the light beam 10 and the rotation of the disk 12. For example, when the rate of the light beam 10 is four times the rate of rotation of the disk 12, the display A of Figure 5 will appear. This display may be termed the fourth harmonic display, since the disk 12 is illuminated with the pattern in four different positions during each revolution. Due to the phenomenon of persistence of human vision, the display seen during such illumination will appear as the entire and continual scene.

When there is a slight difference from an even multiple relationship between the rate of rotation of the disk 12 and the rate of the intermittent light in the beam 10, the display as in display A, will appear to move around the disk, since the disk 12 is illuminated in a slightly different position during each revolution. It is during this interval, when movement appears, that animated effects may be accomplished in the display.

As disk 12 is further accelerated, and the rate of rotation of the disk 12 will become one third the rate of the light beam 10 and the display B will appear and come to a stand still. This phenomenon results because the observer only sees the pattern on the disk 12 when it is in the positions as shown in display B, since it is only in these positions that the disk is illuminated by the beam of light.

As the motor 48 continues to increase its rate of rotation it will soon exceed one third the repetition rate of the intermittent light beam 10, and the display B will appear to move about the disk.

As the motor 48 continues to accelerate toward full speed, the rate of rotation of the disk 12 approaches one half the rate of occurrence of the intermittent light beam 10. At this time the display C of Figure 5 will be seen by the observer. This display is formed by the disk 12 being illuminated at two positions per revolution, approximately 180 degrees apart. The display C will first appear to move, then come to a standstill when synchronism occurs between light and rotation, then again appear to move.

As disk 12 is further accelerated by the accelerating motor 48, the rate of rotation will approach the rate of occurrence of the intermittent light passing through the apertures 18 and 20. At this time the observer will see the display D as shown in Figure 5.

Of course each of these displays will first materialize and appear to revolve about the disk 12, then appear to stop for an interval, and then revolve in a direction opposite to the previous direction. It is to be noted that during each interval between the exhibitions of the displays of Figure 5, the display will be somewhat confused; however, in complex patterns this display may consist of very interesting color patterns.

Of course many figures (as represented by the lines in the displays of Figure 5) may be made to appear either by increasing the number of figures as the line in the illustrative pattern or changing the speed of the disk 12. In practice very interesting displays have been formed by dividing the pattern annularly, and placing a recurring figure in each annular strip.

When the motor 48 reaches some predetermined rate of rotation as full speed, and is driving the disk 12 at a similar rate, the cam 56 will have moved to a position where the extension 59 will touch the movable contact of the switch 60. The extension 59 will move this contact away from the lower contact of the switch to touch the upper contact of this switch. As a result of this switching operation the lamps 14 and 16 will be de-energized while the lamp 46 will be energized. That is, the electrical current from the conductors 68 and 70 will be switched from the lamps 14 and 16 to flow through the lamp 46. As a result, the intermittent light impinging upon the disk 12 will be stopped and continual light will temporarily illuminate the disk 12. As a result, the observer will now see the disk 12 revolving under continual light, or fully illuminated as it moves at a high rate of speed with all the colors in the display blended together.

This mode of operation will exist only for a predetermined interval until the extension 59 is moved past switch 60 allowing the movable contact of the switch to return to a lower position. Intermittent light will then again illuminate the disk 12 with the disk revolving at full speed. The system now functions to hold the motor speed at some constant value and the display D will remain in view for a set interval. This holding of a display results from maintaining a set relationship between the rates of the beam 10 and the rotation of the disk 12. In the described embodiment, the interval is provided by forming the cam 56 so that the motor 48 will reach full speed and there hold for an interval. Of course other arrangements may be provided for maintaining a particular rate relationship between the beam 10 and the revolving disk 12 for some interval. Such arrangements may include the provision of pulleys of different diameters upon the shaft driving the disk 12, with provision for alternately driving the different pulleys to thereby impart different constant speeds to the disk 12. In this manner various displays as shown in Figure 5 may be held for a predetermined interval.

In addition various switching arrangements may also be incorporated to vary the electrical circuit through which the motor driving the disk 12 is energized and thereby provide different constant speeds for the motor to hold a display on the disk 12 for a set interval of time.

In the operation of the described embodiment, as the cam 56 continues to revolve, a point is reached where the cam 56 moves to allow the movable contact of the switch 62 to fall upon the unraised portion of the cam thereby opening the switch 62. When the switch 62 opens, the motor 48 will be de-energized and the motor and the disk 12 will begin to decelerate. As the disk 12 decelerates, the displays A, B and C of Figure 5 explained during acceleration of the disk 12, will appear in reverse order. Therefore, again an interesting and attention-commanding performance is given by the revolving disk 12 operating in conjunction with the intermittent light illuminating the disk 12.

As the friction and windage of the system slows the rate of rotation of the disk 12 down to some predetermined lower level, the extension 57 mounted upon the cam 56 will be moved to close the switch 64 thereby energizing the solenoid 54. With the energization of the solenoid 54, the lever 52, anchored at a point 53, will be attracted by the solenoid 54, causing a force to be exerted upon the shaft 50. This force exerted upon the shaft 50 will act to brake the shaft 50 and the disk 12 thereby bringing the disk 12 to a complete stop. The brake is provided to stop the disk 12 more rapidly, after a certain lower speed is reached. This is done because the disk 12 may have sufficient momentum to rotate for some time at a low speed and the display provided during such an interval may tend to be less interesting than other parts of the cycle. During a brief interval after the disk 12 is stopped it is held in one position thereby giving the observer an opportunity to observe the pattern actually mounted upon the disk 12.

After the brief interval during which the disk 12 is stationary the switch 62 will again be closed to energize the motor 48 and begin the acceleration of the disk 12. With the acceleration of the disk 12 the cycle will be repeated to provide the observer another interesting spectacle.

It is to be appreciated that the displays shown in Figure 5 are exceedingly simplified and serve only to indicate the phenomenon observed by the observer during different brief intervals. However, in actual practice more complex patterns will be placed on the disk 12 which may contain advertising, or similar matter in the form of trade-marks, trade names, product displays, or slogans.

As the display of the disk 12 may be quite large it may be necessary to provide the light beam 10 of high intensity to properly illuminate the disk. For this reason the two lamps 14 and 16 are provided to increase the intensity of the intermittent light impinging upon the disk 12. Of course a single lamp may be used in conjunction with a single aperture in the disk 30, in the event that high intensity light is not required, or alternatively, several lights may be used to obtain very high intensity.

It is also to be understood that various other means from that shown and described to program the system may be provided which will serve to vary the rate of rotation of the disk 12 with respect to the rate of occurrence of the intermittent light impinging upon the disk 12; and further, to periodically illuminate the disk 12 fully with a continuous light. The method of relative speed variation, and constant speed employed in the described embodiment, of simply turning the motor 48 on, holding it at a speed, then turning it off may deviously be replaced by several other forms of rate control, either for the light rate or the disk speed.

Figure 6:
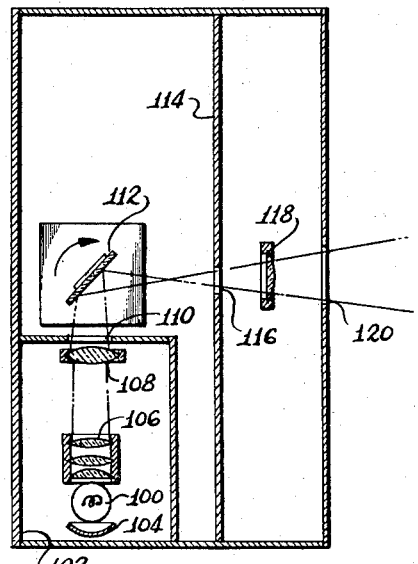
Figure 6 is a sectional view of an alternative form of a light source which may be used in the system of Figure 1.

Referring now to Figure 6, there is shown another form of an intermittent-light generator which may be used in the system of Figure 1. In the light generator as shown in Figure 6, a lamp 100 is mounted within an enclosure 102. A reflector 104 is positioned behind the lamp 100 and serves to reflect light emanating from the lamp through lenses 106. The beam of light emerging from the lens 106 is then pased through a lens 108 and an aperture 110 in the enclosure 102 to impinge upon a rapidly revolving mirror 112. The mirror 112 is positioned within an enclosure 114 which has an aperture 116 and is driven by a motor (not shown). At one position of the revolving mirror 112, the light emanating from the enclosure 102 will be reflected from the mirror through the aperture 116. The light passing through the aperture 16 then passes through a lens 118 and an aperture 120.

The light emanating from this system will be intermittent in its nature because only a brief interval will exist when the light impinging upon the mirror 112 will be reflected through the aperture 116. It is during this brief interval that light emerges from the aperture 120. However, during the period of the remainder of the revolution of the mirror 112 the light beam passing through the aperture 110 either does not fall upon the mirrored surface of the mirror 112, or this light is reflected to a position on the interior of the enclosure 114 other than the position of the aperture 116. The advantages of the source of intermittent light as shown in Figure 6 are more silent operation and lighter construction.

Figure 7:
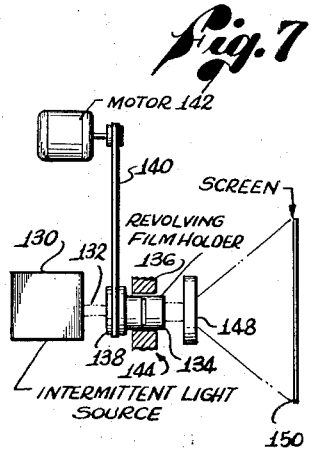
Figure 7 is a diagrammatic showing of an alternative system constructed in accordance with the principles of this invention.

In Figure 7 there is shown another system for providing a visual display in accordance with the invention. In the system of Figure 7 there is shown an intermittent light source 130. This intermittent light source 130 may take the form of apparatus similar to that shown in Figure 6, or alternatively of the light source as shown in Figure 1. A beam of light 132 is projected from the source of intermittent light 130 to pass through a pattern mounting member 134. The mounting member 134 is rotatably mounted within a bearing 136, and carries a pulley 138 which is driven through a belt 140 by a motor 142. The mounting member 134 is hollow and contains a slot 144 in which transparent display patterns are mounted. These display patterns may consist of 35 mm. color transparencies.

The light emerging from the mounting member 134 is passed through a lens box 148 which focuses the image contained by the light beam upon a screen 150. The light illuminating the screen 150 is thus not only intermittent in nature but also carries a rapidly revolving image coinciding to the transparent image positioned within the mounting member.

In the operation of the system shown in Figure 7, the intermittent light emerging from the light source 130 passes through the transparent display pattern mounted within the mounting member 134 and is varied to carry a light image coinciding to the display pattern. As a result, the beam of light projecting from lens box 148 is not only intermittent in nature but also carries a revolving image. The rate of revolution of the image may be varied with respect to the rate of occurrence of the intermittent light to create patterns similar to those described with respect to the system of Figure 1.

The system of Figure 7 has certain advantages in that it may operate under conditions of higher ambient light. The system of Figure 7 also allows bodies of smaller mass to be revolved thereby resulting in less noise. However, the system of Figure 7 does not afford the viewer with a display of the actual revolving disk and therefore may not be as fully attention-commanding or interesting as the system described with reference to Figures 1, 2 and 3.

It may therefore be seen that embodiments of this invention provide an attention-commanding display which will gain and possess the attention of the observer and at the same time may convey an advertising or other message. The message may take various forms and may include animations wherein the characters embodied in the display pattern appear to move in a logical sequence. Other portions of the display may be formed as to materialize from a mass of color, then disappear, in a similar way and perhaps reappear in a different number.

Various modifications and changes may be made with respect to the foregoing description without departing from the spirit of the invention or the scope of the following claims.

I claim:

1. A display apparatus, comprising: a source of intermittent light; a display pattern; means for rotating said display pattern; means for illuminating substantially said entire display pattern with said intermittent light; means for varying the relationship between the rate of rotation of said display pattern and the rate of occurrence of said intermittent light; and programming means to sequentially vary the mode of operation of said apparatus in a predetermined manner.

2. A display apparatus, comprising: a source of intermittent light; a disk adapted to receive a display pattern; means for rotating said disk; means for illuminating said disk with said intermittent light; means for alternatively increasing and decreasing the relative rates between the repetition of said intermittent light and the revolution of said disk; means for periodically illuminating said disk with constant light during an interval; and program means for controlling said means for periodically illuminating said disk with continuous light and said means for varying the relative rates.

3. A system according to claim 2 wherein said program means comprises; a motor; a cam connected to be driven by said motor; and a plurality of electrical switches positioned to be controlled by said cam.

4. A system according to claim 2 wherein said means for illuminating said disk comprises: a plurality of sources of light beams; an opaque disk positioned to receive said light beams at different radial positions, said disk including a plurality of apertures radially spaced to coincide to the radial positions of light beams from said light sources; and means for revolving said opaque disk to thereby periodically simultaneously pass light from each of said light beams.

5. A display apparatus, comprising: a source of a beam of light; a mirror positioned to receive said beam of light; means for revolving said mirror; enclosure means positioned about said mirror to thereby enable light reflected from said mirror to pass at only one position of said mirror to form an intermittent beam of light; a disk adapted to receive a display pattern; means for rotating said disk; means for illuminating said disk with said intermittent light; means including braking means for varying the relative rates between the repetition of said intermittent light and the revolution of said disk; means for holding the relative rates between the repetition of said intermittent light and the revolution of said disk essentially unvarying; means for periodically illuminating said disk with constant light for an interval; and program means for controlling said means for periodically illuminating said disk with continuous light, and said means for varying the relative rates.

6. A display apparatus, comprising: a source of intermittent light; a light-transmitting display pattern; means for rotating said display pattern; means for illuminating substantially said entire display pattern with said intermittent light; and means for varying the relationship between the rate of rotation of said display pattern and the rate of occurrence of said intermittent light.

7. Advertising display apparatus comprising: a rotatably mounted opaque disk; a motor connected to drive said disk; first and second light sources positioned adjacent said disk at different radial distances from the center thereof; said disk including a plurality of apertures radially spaced so that one of said apertures coincides with the radial position of one of said light sources so that said apertures periodically simultaneously pass light from each of said light sources when said opaque disk is revolved; a second disk having an opaque display pattern mounted thereon; said second disk being positioned to receive light intermittently transmitted through said apertures; motor means connected to rotate said second disk at a variable rate; program means for controlling the operation of said apparatus including a motor driven cam and a plurality of electrical switches positioned to be actuated by said cam; one of said switches being connected to alternately energize and de-energize the motor driving said second display disk whereby said motor alternately accelerates and decelerates in the respective positions of said switch; brake means for said motor driving said second disk; a second of said switches being positioned to energize said brake means after said disk operating motor has been de-energized for a predetermined interval; an independent light source positioned to illuminate said display disk; and a third of said cam controlled switches being connected to normally de-energize said independent light source and to energize said independent light source to illuminate said disk with a constant uninterrupted beam of light when said disk is not being rotated.

References Cited in the file of this patent

UNITED STATES PATENTS

| | | |
|---|---|---|
| 849,045 | Brown | Apr. 2, 1907 |
| 1,445,977 | Shephard | Feb. 20, 1923 |
| 1,686,615 | Balnojan | Oct. 9, 1928 |
| 1,725,851 | Craig | Aug. 27, 1929 |
| 1,851,585 | Kliegh | Mar. 29, 1932 |
| 2,210,315 | De Verry | Aug. 6, 1940 |
| 2,319,046 | Druce | May 11, 1943 |

FOREIGN PATENTS

| | | |
|---|---|---|
| 1,037,932 | France | May 6, 1953 |
| 1,072,351 | France | Mar. 17, 1954 |